(12) United States Patent
Kuno

(10) Patent No.: US 8,164,795 B2
(45) Date of Patent: Apr. 24, 2012

(54) DEVICE, METHOD, AND COMPUTER PROGRAM PRODUCT FOR CREATING PRINT DATA

(75) Inventor: Masashi Kuno, Obu (JP)

(73) Assignee: Brother Kogyo Kabushiki Kaisha, Nagoay-shi, Aichi-ken (JP)

( * ) Notice: Subject to any disclaimer, the term of this patent is extended or adjusted under 35 U.S.C. 154(b) by 1542 days.

(21) Appl. No.: 11/281,463

(22) Filed: Nov. 18, 2005

(65) Prior Publication Data

US 2006/0109512 A1 May 25, 2006

(30) Foreign Application Priority Data

Nov. 19, 2004 (JP) .................................. 2004-335521

(51) Int. Cl.
*H04N 1/405* (2006.01)

(52) U.S. Cl. ....... 358/3.06; 358/3.23; 358/1.9; 358/534; 358/535; 358/1.16; 358/1.1; 358/1.12; 358/3.01; 358/3.03; 358/3.26; 347/9

(58) Field of Classification Search .................. None
See application file for complete search history.

(56) References Cited

U.S. PATENT DOCUMENTS

| | | | |
|---|---|---|---|
| 5,363,212 A | | 11/1994 | Taniuchi et al. |
| 6,142,598 A | * | 11/2000 | Iwasaki et al. .................. 347/9 |
| 6,238,105 B1 | | 5/2001 | Pardo |
| 6,283,571 B1 | | 9/2001 | Zhou et al. |
| 6,471,352 B2 | | 10/2002 | Akahira |
| 6,474,777 B1 | | 11/2002 | Fujita et al. |
| 6,533,182 B1 | * | 3/2003 | Ohshima et al. .............. 235/494 |
| 6,782,116 B1 | | 8/2004 | Zhao et al. |
| 6,975,425 B1 | | 12/2005 | Abe et al. |
| 6,984,011 B2 | | 1/2006 | Shimada et al. |
| 7,018,010 B2 | | 3/2006 | Kobayashi et al. |
| 7,073,883 B2 | | 7/2006 | Billow |
| 7,086,711 B2 | | 8/2006 | Iwao et al. |
| 7,118,191 B2 | | 10/2006 | Fagan et al. |

(Continued)

FOREIGN PATENT DOCUMENTS

JP 61-262131 A 11/1986

(Continued)

OTHER PUBLICATIONS

Non-Final Office Action mailed Dec. 17, 2009, U.S. Appl. No. 11/281,463.

(Continued)

*Primary Examiner* — Benny Tieu
*Assistant Examiner* — Pawandeep Dhingra
(74) *Attorney, Agent, or Firm* — Banner & Witcoff, Ltd.

(57) ABSTRACT

A device for creating print data utilized by a printer is disclosed. The print data includes a coordinate at which a dot is to be formed on a print medium by the printer. The print data creating device is provided with a first device and a second device. The first device chooses a first coordinate from bit-mapped data. The bit-mapped data includes a plurality of combinations of the first coordinate and color information. The first device chooses the first coordinate based on the color information being combined with the first coordinate. The second device creates the print data by converting the first coordinate chosen by the first device into at least two second coordinates which are randomly chosen from at least three second coordinates located in the neighborhood of the first coordinate.

7 Claims, 13 Drawing Sheets

U.S. PATENT DOCUMENTS

| | | | |
|---|---|---|---|
| 7,198,347 B2 | 4/2007 | Tayuki | |
| 7,222,927 B2 | 5/2007 | Eguchi et al. | |
| 7,290,858 B2 | 11/2007 | Furuichi et al. | |
| 7,301,672 B2 | 11/2007 | Abe et al. | |
| 7,336,392 B2 * | 2/2008 | Kakutani | 358/1.9 |
| 7,474,441 B2 * | 1/2009 | Karito | 358/3.01 |
| 7,487,324 B2 | 2/2009 | Tanaka | |
| 2001/0026307 A1 | 10/2001 | Akahira | |
| 2004/0046832 A1 | 3/2004 | Kuwahara | |
| 2004/0174569 A1 * | 9/2004 | Karito | 358/3.01 |
| 2004/0189727 A1 * | 9/2004 | Eguchi et al. | 347/9 |
| 2006/0109515 A1 | 5/2006 | Zhao | |

FOREIGN PATENT DOCUMENTS

| | | |
|---|---|---|
| JP | 7-323609 | 12/1995 |
| JP | 2001-228320 A | 8/2001 |
| JP | 2003-094693 A | 4/2003 |
| JP | 2004-009549 A | 1/2004 |
| JP | 2004-017565 A | 1/2004 |
| JP | 2004-262102 A | 9/2004 |
| WO | 03/045696 A1 | 6/2003 |

OTHER PUBLICATIONS

Non-Final Office Action mailed Dec. 17, 2009, U.S. Appl. No. 11/285,291.

Co-pending U.S. Appl. No. 11/285,291, filed Nov. 23, 2005.

Co-pending U.S. Appl. No. 11/277,795, filed Mar. 29, 2006.

JP Office Action dtd Jun. 8, 2010, JP Appln. 2004-335521, English translation.

JP Office Action dtd Jun. 8, 2010, JP Appln. 2004-341928, English translation.

Notice of Allowance dtd Jul. 29, 2010, U.S. Appl. No. 11/285,291.

* cited by examiner (a)  (b)

| Random Number | Sub-Coordinate |
|---|---|
| 0 | C0,C1 |
| 1 | C0,C2 |
| 2 | C0,C3 |
| 3 | C1,C2 |
| 4 | C1,C3 |
| 5 | C2,C3 |

FIG. 11

| ex. | Number of Sub-Coordinates | Size of Dot |
|---|---|---|
| 1 | 2 | Small,Small |
| 2 | 2 | Small,Medium |
| 3 | 2 | Medium,Medium |
| 4 | 3 | Small,Small,Small |
| 5 | 3 | Small,Small,Medium |
| 6 | 3 | Small,Medium,Medium |
| 7 | 3 | Medium,Medium,Medium |
| 8 | 4 | Small,Small,Small,Medium |
| 9 | 4 | Small,Small,Medium,Medium |
| 10 | 4 | Small,Medium,Medium,Medium |

DEVICE, METHOD, AND COMPUTER PROGRAM PRODUCT FOR CREATING PRINT DATA

CROSS-REFERENCE TO RELATED APPLICATION

This application claims priority to Japanese Patent Application No. 2004-335521, filed on Nov. 19, 2004, the contents of which are hereby incorporated by reference into the present application.

BACKGROUND OF THE INVENTION

1. Field of the Invention

The present invention relates to a device for creating print data utilized by a printer. The present invention further relates to a method for creating print data and a computer program product for creating print data. The printer of the present specification includes all devices for printing words or images onto a print medium. For example, the printer of the present specification includes ink jet printers and laser printers. Lic jet printers and laser printers include copying machines, fax machines, multifunctional products, etc.

2. Description of the Related Art

General printers may utilize colorant such as ink, toner, etc. to form points on a print medium. Desired words or images are thus formed on the print medium. In the present specification, a point formed on a print medium by a printer utilizing colorant is termed a dot. For example, in the case of an ink jet printer, a point formed on a print medium by discharging one droplet of ink from one nozzle toward the print medium is termed a dot. Furthermore, a point formed on a print medium by discharging a plurality of ink droplets onto the same location on the print medium from one or a plurality of nozzles is also termed a dot.

An ink jet printer discharges ink droplets from each nozzle towards a print medium, thus forming dots on the print medium. The ink jet printer may be utilized while connected with an external device such as a personal computer, or the like. In the case where an image shown on a display of the personal computer is to be printed by the ink jet printer, the personal computer creates bit-mapped data by dividing the image into a matrix shape. The bit-mapped data includes color information of coordinates disposed in the matrix shape. In the case of a color image, the color information of the bit-mapped data can be represented as a combination of color and color density of that color. Consequently, bit-mapped data of the color image includes a plurality of combinations of coordinate, color, and color density. Further, in the case of a monochrome image, the color information of the bit-mapped data can be represented as a combination of single color and color density, or can be represented only as color density. The bit-mapped data of the monochrome image includes a plurality of combinations of coordinate, single color, and color density (or a plurality of combinations of coordinate and color density).

The personal computer chooses coordinates at which dots will be formed from the bit-mapped data. This process is performed based on the color information of the coordinates included in the bit-mapped data. The coordinates are chosen from the bit-mapped data by using, for example, the halftone process or the dither method. The personal computer outputs the information representing the chosen coordinates to the ink jet printer. Here, this information is termed print data. The print data for color printing can be formed from, for example, a plurality of combinations of a chosen coordinate and color (for example, any one out of cyan, magenta, yellow, and black). The ink jet printer inputs the print data output from the personal computer, and forms dots based on the print data that has been input. For example, in the case where a combination of the coordinate (x, y) and yellow is included in the print data, the ink jet printer forms a yellow dot at the coordinate (x, y).

FIG. 12 is a figure schematically showing an example of dots 100 formed by the ink jet printer. In the example shown in FIG. 12, the dots 100 are formed in 8 rows×8 lines. In FIG. 12, the dots have not been filled with ink. The numbers shown above the dots 100 are row numbers, and the numbers shown to the left of the dots 100 are line numbers. Two adjacent dots 100 in the row direction or line direction overlap. The arrow A in the figure shows the direction of movement of the print medium with respect to the nozzles. Below, eight dots aligned in the A direction will be termed a dot row, and eight dots aligned in a direction orthogonal to the A direction will be termed a dot line. In this example, eight dot rows and eight dot lines are formed. Below, the rows will be represented as x coordinates and the lines will be represented as y coordinates. Sixty four coordinates (1, 1), (1, 2), etc. are included in the print data being utilized to form the sixty four dots 100 shown in this example.

Ink is discharged from the nozzles while the print medium is moving with respect to the nozzles in the direction of the arrow A. For example, the eight dots of the first dot row are formed by continuously discharging ink droplets from one nozzle while the print medium is moving with respect to the nozzle in the direction of the arrow A. Similarly, the eight dots of the second dot row are also formed by continuously discharging ink from one different nozzle. Eight nozzles are required to form the eight dot rows shown in FIG. 12. All the dots 100 are formed uniformly in the example shown in FIG. 12, and printing could be termed satisfactory.

However, it may happen that the eight nozzles for forming the eight dot rows are not formed in an evenly spaced manner in tee row direction. FIG. 13 shows an example of the dots 100 where the position of one of the nozzles in the row direction is slightly displaced. In this example, the nozzle for forming the fifth dot row is displaced towards the left. As a result, the fifth dot row is formed in a position that is displaced towards the left. In this case, there is a major overlap between the fourth dot row and the fifth dot row, and there is almost no overlap between the fifth dot row and the sixth dot row. The portion where there is a major overlap between the two adjacent dots is darker, and the portion where the two adjacent dots do not overlap is lighter. Consequently, it is considerably darker between the fourth dot row and the fifth dot row, and it is considerably lighter between the fifth dot row and the sixth dot row. The array pattern of the dots in the line direction (the A direction) is regular. As a result, dark portions and light portions are periodically repeated in the dark region between the fourth dot row and the fifth dot row. Further, dark portions and light portions are periodically repeated in the light region between the fifth dot row and the sixth dot row. It was understood from the research of the present inventors that the difference in density between the dark region and the light region is readily perceived when dark portions and light portions are periodically repeated in the dark region (or the light region). This perception of a difference in density between the dark region and the light region leads a user to feel that the printing result is bad.

The following technique is taught in Japanese Patent Application 7-323609. In this technique, an external device connected with an ink jet printer converts coordinates chosen from bit-mapped data. For example, in the case where a coordinate (1, 2) was chosen from the bit-mapped data, one coordinate is chosen randomly from four coordinates (hereafter referred to as sub-coordinates) located in the neighborhood of the coordinate (1, 2). The four sub-coordinates are aligned in the direction in which the print medium moves with respect to the nozzles. FIG. 14 (*a*) shows an example of the four sub-coordinates D0 (1, 2), D1 (1, 2+t), D2 (1, 2+2 t), and D3 (1, 2+3 t). One sub-coordinate is chosen randomly from the four sub-coordinates D0 to D3. One coordinate is thus converted to one sub-coordinate. Information representing the chosen sub-coordinate is, included in print data. The external device outputs the print data to the ink jet printer. The ink jet printer forms dots based on the print data output from the external device. For example, in the case where the combination of the sub-coordinate D2 and black is included in the print data, a black dot is formed at the coordinate D2 (1, 2+2 t) on the print medium.

FIG. 14 (*b*) shows an example of twenty four dots formed by this technique. The sub coordinate where the dot is formed is a coordinate located in the neighborhood of the coordinate that was chosen from the bit-mapped data. Consequently, the dots can be formed on the print medium without there being any loss of the image information of the bit-mapped data. In this technique, the y coordinates of the sub-coordinates are chosen randomly, and as a result the dots are formed randomly in the y direction (the A direction). Consequently, even if there is displacement of the nozzles in the x direction, dark portions and light portions are not periodically repeated in the dark region (or the light region). As a result, the difference in density between the dark region and the light region is not readily perceived.

However, when the print data is formed by randomly choosing one sub-coordinate from four sub-coordinates, two adjacent dots may be mutually separated by a large distance. In this case, as shown by the symbol A' in FIG. 14 (*b*), a large blank portion may be formed between two adjacent dots. Furthermore, even though a blank portion might not be formed, the quantity of overlap between the two adjacent dots may be extremely small. In the case where a dark region is formed in the neighborhood of the overlapping portion, this overlapping portion will appear comparatively lighter. In this case, this may appear as if a blank portion has been formed.

In the aforementioned technique, blank portions may be formed (or it may appear as if blank portions has been formed) even when a fully printed region was desired on the print medium. In this case, printing results are poor. In the aforementioned technique, the fin printing results may be poor.

BRIEF SUMMARY OF THE INVENTION

The present invention has been created taking the above situation into consideration. The present invention presents a technique whereby the difference in density between dark regions and light regions is not readily perceived, and whereby printing results are prevented from being poor.

An example of a print data creating device of the present embodiment will be described using FIG. 15. FIG. 15 schematically shows the contents of bit-mapped data obtained from an image that a user wants to print. Here, the description is using, as an example, bit-mapped data obtained from a monochrome image of the letter 'A'. One hundred coordinates (here these are termed first coordinates) are included in the bit-mapped data shown in FIG. 15. In the bit-mapped data, each first coordinate is combined with information showing color density. The first coordinates that correspond to the letter 'A' are combined with large color density. For example, the first coordinate (5, 3) and large color density are combined. The first coordinates that do not correspond to the letter 'A' are combined with small color density. For example, the first coordinate (5, 2) and small color density are combined.

The print data creating device chooses first coordinates at which dots will be formed from the bit-mapped data. Here, first coordinates that are combined with color density having at least a predetermined value are chosen. In the example of FIG. 15, fourteen first coordinates that form diagonal lines are chosen. The first coordinates that have been chosen are each converted into at least two second coordinates which are randomly chosen from at least three second coordinates located in the neighborhood of the first coordinate. In FIG. 15, the first coordinate (3, 7) is converted into two second coordinates $(3+\alpha 2, 7+\beta 2)$, $(3+\alpha 3, 7+\beta 3)$ that were chosen randomly from four second coordinates. Print data is formed by converting the chosen first coordinate into second coordinates. The print data includes information showing that dots must be formed at the second coordinates. For example, the print data includes the information that dots must be formed at the second coordinate $(3+\alpha 2, 7+\beta 2)$ and the second coordinate $(3+\alpha 3, 7+\beta 3)$. The printer forms the dots on the print medium based on the print data that has been formed. In the above example, dots are formed at the second coordinate $(3+\alpha 2, 7+\beta 2)$ and the second coordinate $(3+\alpha 3, 7+\beta 3)$. The image desired by the user (the letter 'A' in the example of FIG. 15) is thus formed on the print medium.

FIG. 15 and the contents based thereon that have been described above are an example, and the scope of the present invention is not restricted based on FIG. 15 or the above contents. The scope of the present invention is determined on the basis of the claims. The print data creating device of the present invention can be represented as follows.

This specification discloses a device for creating print data utilized by a printer. The print data includes a coordinate at which a dot is to be formed on a print medium by the printer. The print data creating device is provided with a first device and a second device.

The first device chooses a first coordinate from bit-mapped data. The bit-mapped data includes a plurality of combinations of the first coordinate and color information. The color information can be represented as a combination of color and color density. Further, the color information can also be represented as color density alone. The first device chooses the first coordinate based on the color information that is being combined with the first coordinate. The first device may, for example, choose one first coordinate based on the color information of a plurality of first coordinates. Further, the first device may determine whether to choose one first coordinate based only on the color information of that one first coordinate.

The second device creates the print data by converting the first coordinate chosen by the first device into at least two second coordinates which are randomly chosen from at least three second coordinates located in the neighborhood of the first coordinate. The three or more second coordinates located in the neighborhood of the first coordinate may include the first coordinate, or may exclude the first coordinate. The second device itself may equally well randomly choose at least two second coordinates from at least three second coordinates. Further, the second device may equally well not choose randomly. In this case, the second device converts the first coordinate into at least two second coordinates that have been chosen in advance. The print data is created by converting the first coordinate that have been chosen by the first device into the second coordinates.

BRIEF DESCRIPTION OF THE DRAWINGS

FIG. 7 (b) shows four sub-coordinates obtained from the coordinate shown in FIG. 7 (a).

FIG. 9 (b) shows a schematic view of the contents of print data created in the case where adjusted mode has been chosen.

FIG. 10 (b) shows a dot pattern created in the case where the adjusted mode has been chosen.

FIG. 11 shows combinations of number of sub-coordinates and size of dots.

FIG. 14 (b) shows dots created at the sub-coordinates.

In FIG. 15, a case is shown as an example where a first coordinate has been converted into second coordinates.

DETAILED DESCRIPTION OF THE INVENTION

Figure 1:
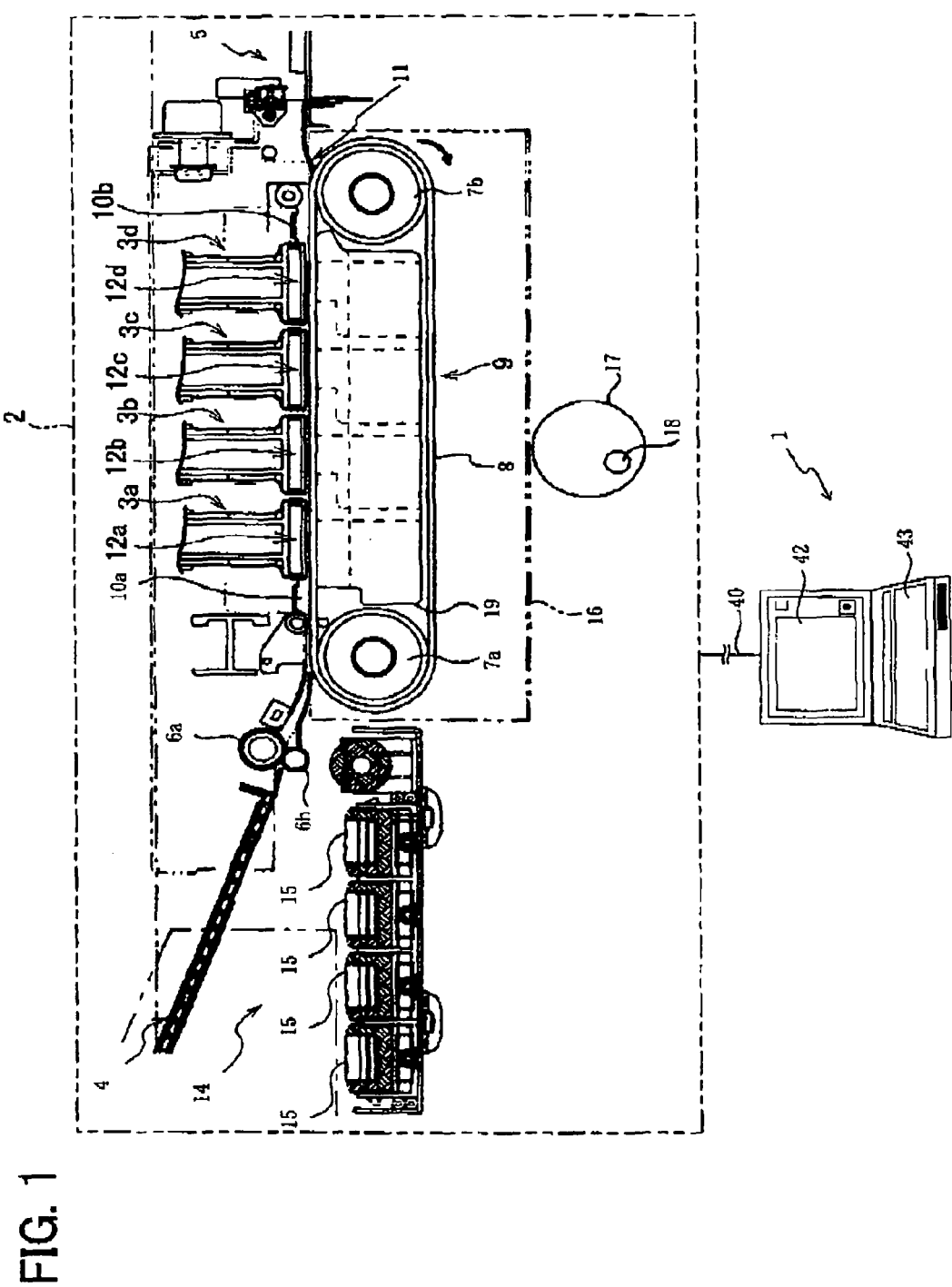
FIG. 1 shows a schematic diagram of an ink jet printer and a personal computer.

Print data created by a print data creating device may be utilized in an ink jet printer having a plurality of nozzles for discharging ink toward a print medium. Further, the print data may equally well be utilized in a different printer. The ink jet printer may be either a line type or a serial type.

The print data creating device may be mounted in the ink jet printer. Alternatively, the print data creating device may be configured separately from the ink jet printer. In the latter case, the print data creating device is capable of communicating with the ink jet printer. The print data creating device and the ink jet printer may be connected by a cable, or may be connected wirelessly. The print data creating device outputs the print data created by a second device to the ink jet printer.

The second device of the print data creating device may create the print data which includes a plurality of combinations of a second coordinate and a color, the color having been determined based on color information that has been combined with a first coordinate, this first coordinate having been converted into the second coordinate. The printer may form a dot at the second coordinate, this dot being a color combined with the second coordinate.

The ink jet printer may further comprise a transferring device. The transferring device transfers the nozzles and/or the print medium along a predetermined direction in a state in which at least one nozzle faces the print medium.

It is preferred that the second device of the print data creating device converts the first coordinate obtained from the first coordinate chosen by the first device into at least two second coordinates which are randomly chosen from at least three second coordinates aligned along the predetermined direction.

The ink jet printer may be capable of chan a unit ink quantity. This is an ink quantity discharged from one nozzle to form one dot on the print medium The second device of the print data creating device may create the print data which includes a plurality of combinations of the unit ink quantity and the second coordinate obtained from the first coordinate chosen by the first device.

The ink jet printer can execute a printing operation based on a combination of the unit ink quantity and the second coordinate. For examples in the case where a combination of the second coordinate (x, y) and the unit ink quantity a are included in the print data, a dot is formed at the coordinate (x, y) by discharging the ink quantity a.

Each unit ink quantity included in the print data may be smaller than the largest unit ink quantity which the ink jet printer is cable of changing.

The first device of the print data creating device may be capable of creating easy print data which includes a plurality of combinations of the unit ink quantity and the first coordinate chosen by the fist device. In this case, the print data creating device may allow a user to select either the print data created by the second device or the easy print data created by the first device. The selected print data or the selected easy print data is utilized by the ink jet printer.

The unit ink quantity included in the easy print data may be different from the unit ink quantity included in the print data. The second device may convert the first coordinate chosen by the first device into a predetermined number of second coordinates. A combination of the unit ink quantity included in the easy print data and the unit ink quantity included in the print data may be determined such that optical density of a predetermined area at which one dot is to be formed based on the easy print data is substantially equal to optical density of the predetermined area at which the predetermined number of dots are to be formed based on the print data.

The aforementioned print data creating device obtains the second coordinates after the first coordinates have been chosen from the bit-mapped data. This can be varied as follows. One example of a print data creating device comprises a third device and a fourth device.

Figure 15:
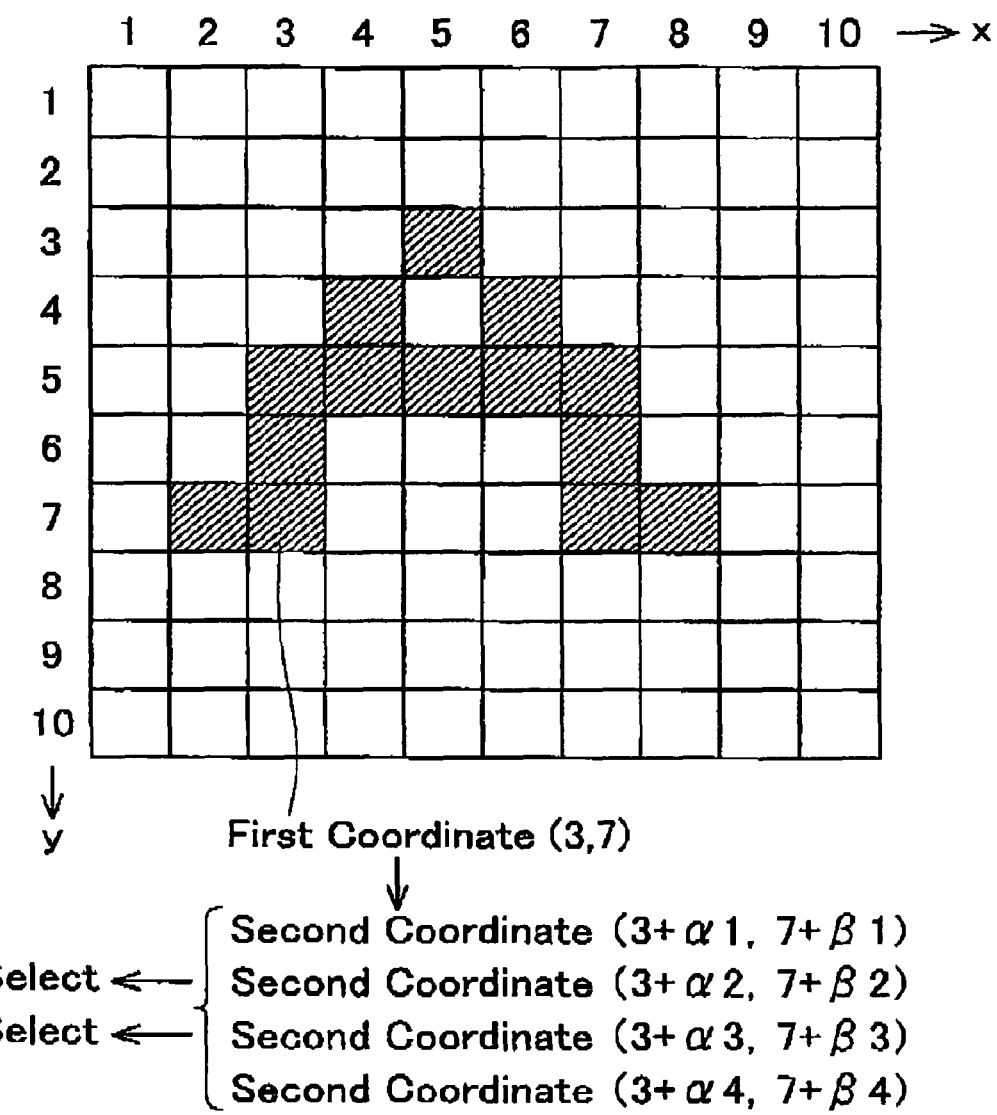
FIG. 15 shows an example of bit-mapped data.

The third device creates second bit-mapped data from first bit-mapped data. The first bit-mapped data includes a plurality of combinations of a first coordinate and color information. The third device converts each first coordinate included in the first bit-mapped data into at least two second coordinates which are randomly chosen from at least three second coordinates located in the neighborhood of the first coordinate. Using FIG. 15 as an example, each of 100 first coordinates is converted into at least two second coordinates. For example, a first coordinate (3, 7) is converted into two second coordinates $(3+\alpha 2, 7+\beta 2)$, $(3+\alpha 3, 7+\beta 3)$. In the example in FIG. 15, all of the one hundred first coordinates are converted into second coordinates. The third device creates the second bit-mapped data which includes a plurality of combinations of the second coordinate obtained from the first coordinate and the color information that has been combined with the first coordinate. Using FIG. 15 as an example, a combination of the second coordinate $(3+\alpha 2, 7+\beta 2)$ and color information (for example, a large color density) is created. This color information has been combined with the first coordinate (3, 7). Furthermore, a combination of the second coordinate (3+α3, 7+β3) and large color density is created. Moreover, in the case where, for example, a first coordinate (1, 1) is converted into two second coordinates (1+α1, 1+β1), (1+α2, 1+β2), a combination of the second coordinate (1+α1, 1+β1) and the color information (for example, small color density) is created. This color information has been combined with the first coordinate (1, 1). Further, a combination of the second coordinates (1+α2, 1+β2) and small color density is created.

The fourth device creates the print data by choosing a second coordinate from the second bit-mapped data. The fourth device chooses the second coordinate based on the color information that is combined with the second coordinate. In the earlier example, the second coordinates (3+α2, 7+β2), (3+α3, 7+β3) combined with the large color density may be chosen. Further, the second coordinates (1+α1, β1), (1+α2, 1+β2) combined with the small color density need not be chosen. The information showing the chosen second coordinates is included in the print data.

The following print data creating device is also useful. This print data creating device comprises a first device and a fifth device.

The first device chooses a first coordinate from bit-mapped data. The bit-mapped data includes a plurality of combinations of the first coordinate and color information. The first device chooses the first coordinate based on the color information that is combined with the first coordinate.

The fifth device converts the first coordinate chosen by the first device into at least two second coordinates located in the neighborhood of the first coordinate. In the example in FIG. 15, a first coordinate (3, 7) is converted into four second coordinates (3+α1, 7+β1), (3+α2, 7+β2), (3+α3, 7+β3), (3+α4, 7+β4). The fifth device randomly chooses at least one second coordinate from at least two second coordinates into which the first coordinate was converted. In the example in FIG. 15, two second coordinates (3+α2, 7+β2), (3+α3, 7+β3) have been chosen. The fifth device creates the print data which includes a plurality of combinations of the unit ink quantity and the second coordinate. In the earlier example, the following combinations are created; the second coordinate (3+α1, 7+β1) and the unit ink quantity, the second coordinate (3+α2, 7+β2) and the unit ink quantity, the second coordinate (3+α3, 7+β3) and the unit ink quantity, and the second coordinate (3+α4, 7+β4) and the unit ink quantity. In this case, it is preferred that the unit ink quantity combined with the second coordinate chosen by the fifth device is different from the unit ink quantity combined with the second coordinate not chosen by the fifth device. For example, in the example of FIG. 15, the unit ink quantities combined with the second coordinates (3+α2, 7+β2), (3+α3, 7+β3) are different from the unit ink quantities combined with the second coordinates (3+α1, 7+β1), (3+α4, 7+β4).

If this is done, the size of the dots formed at the second coordinates (the four second coordinates in the above example) that correspond to the one first coordinate will randomly differ. When the size of the dots randomly differs, dark portions and light portions are not periodically repeated in dark regions or light regions even if these dark regions or light regions are formed in the dots. Further since one first coordinate is converted into at least two second coordinates, the dots have a high array density. Consequently, it is possible to prevent there being a large separation between two adjacent dots.

An embodiment of the present invention will be described with reference to the drawings. FIG. 1 shows a schematic diagram of a personal computer 1 and an ink jet printer 2 of the present embodiment. Below, the personal computer 1 will be referred to simply as a PC. Further, the ink jet printer 2 will be referred to simply as a printer. The PC 1 and the printer 2 are connected so as to be capable of communication by means of a communication cable 40.

The PC 1 creates print data (to be described), and outputs this print data to the printer 2. The PC 1 has an LCD 42 and a keyboard 43, etc. The LCD 42 displays images. A user can input instructions using the keyboard 43. For example, the user can instruct the image displayed on the LCD 42 to be printed by the printer 2.

The printer 2 is a color ink jet printer. The printer 2 executes a printing operation based on the print data output from the PC 1.

Figure 2:
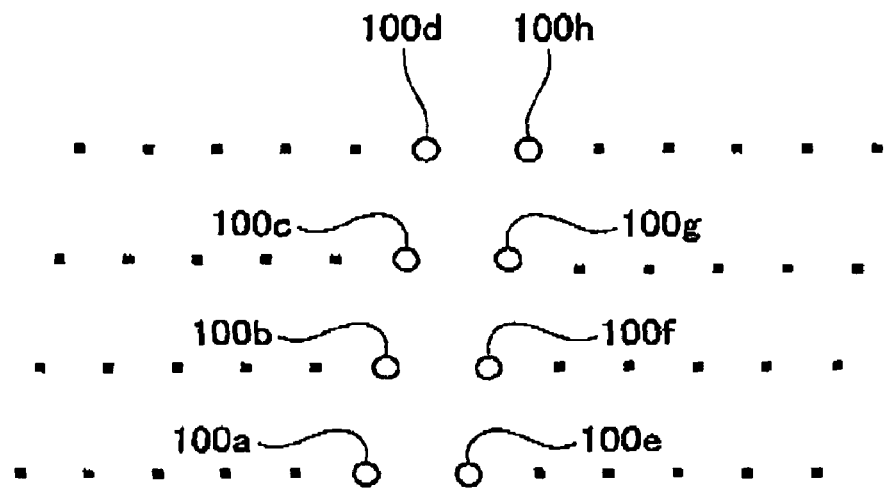
FIG. 2 shows a simplified view of nozzles of the ink jet printer.
Figure 2:
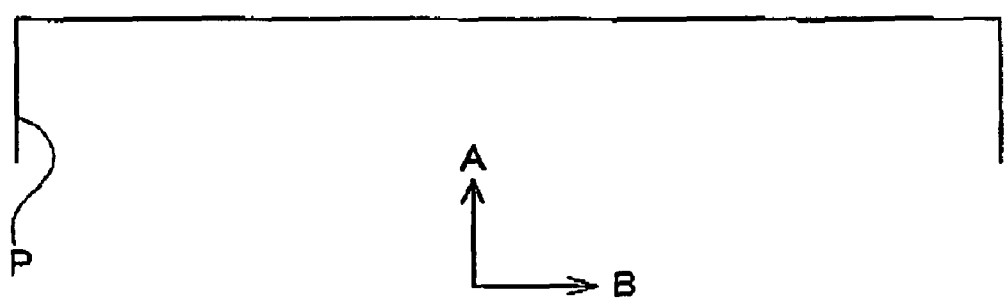

The configuration of the printer 2 will be described. The printer 2 has a paper supply portion 4 that is disposed at the left side of the figure. The paper supply portion 4 houses printing paper P which is not shown in FIG. 1, but is shown in FIG. 2. A pair of delivery rollers 6a and 6b is disposed to the right of the paper supply portion 4. The printing paper P housed in the paper supply portion 4 is gripped between the delivery rollers 6a and 6b and is delivered thereby toward the right.

A printing paper conveyer 10 is disposed to the right of the paper supply portion 4. The printing paper conveyer 10 has a pair of belt rollers 7a and 7b, a belt 8, etc. The belt 8 is wound across the belt rollers 7a and 7b. The belt roller 7a is connected to an LF motor 29 (see FIG. 3). The belt roller 7a is rotated in a clockwise direction by driving the LF motor 29. When the belt roller 7a rotates in a clockwise direction, the belt 8 and the belt roller 7b follow its rotation and rotate in a clockwise direction. When the belt 8 rotates in a clockwise direction, the printing paper P mounted on an upper face of the belt & is conveyed toward the right. Silicon processing has been executed on an outer peripheral face of the belt 8.

The belt rollers 7a and 7b and the belt 8 are supported by a chassis 16. The chassis 16 is mounted on a cylindrical member 17 disposed below the chassis 16. The cylindrical member 17 is capable of rotating with an axis 18 as the center, this axis 18 being located at a position removed from the center of the cylindrical member 17. When the cylindrical member 17 rotates with the axis 18 as the center, the height of an upper edge of the cylindrical member 17 changes. A guide 19 is disposed at an inner circumference of the belt 8. The guide 19 is supported by the chassis 16. The guide 19 supports the belt 8.

A pressing member 10a is disposed slightly above the belt roller 7a The pressing member 10a pushes the printing paper P towards the belt 8 so as to prevent the printing paper P from rising off this belt 8. A pressing member 10b is disposed slightly above the belt roller 7b. The pressing member 10b also pushes the printing paper P towards the belt 8.

A separating member 11 is disposed to the right of the belt 8. The separating member 11 separates the printing paper P from the upper face of the belt 8.

A paper discharge section 5 is disposed to the right of the separating member 11. The paper discharge section 5 houses the printing paper P that has been conveyed toward the right by the belt 8.

Four ink jet heads 3a to 3d are located above the printing paper conveyer 10. The ink jet head 3a has a head main body 12a at its lower edge. The head main body 12a has a rectangular parallel-piped shape that extends in a perpendicular direction relative to the plane of the page of FIG. 1. A plurality of nozzles 100 (represented by the numbers 100a to 100h in FIG. 2) is formed in a lower face of the head main body 12a. Each nozzle 100 discharges ink droplets toward the printing paper P on the belt 8. Like the ink jet head 3a, the other ink jet heads 3b to 3d each have a head main body 12b to 12d respectively. The ink jet head 3a discharges magenta ink. The ink jet head 3b discharges yellow ink. The ink jet head 3c discharges cyan ink. The ink jet head 3d discharges black ink. In the present embodiment, the ink jet heads 3a to 3d are fixed to a printer main body (not shown). Therefore, the ink jet heads 3a to 3d do not move. That is, the printer 2 of the present embodiment is a line type ink jet printer.

A space is formed between the lower faces of the head main bodies 12a to 12d and the upper face of the belt 8. The printing paper P is conveyed towards the right along this space. The printing paper P passes in turn below the four head main bodies 12a to 12d. At this time, ink of the various colors is discharged from the nozzles of the head main bodies 12a to 12d.

The configuration of the head main body 12a will now be described in detail. Since the other head main bodies 12b to 12d have the same configuration as the head main body 12a, a detailed description thereof will be omitted. FIG. 2 shows a simplified plan view of a base face (a face in which nozzles are formed) of the head main body 12a FIG. 2 is a diagram that has been greatly simplified, and a more complicated arrangement of nozzles is actually adopted. Details of the configuration of the ink jet head are taught in, for example, U.S. Pat. No. 4,633,268. The contents thereof may be incorporated by reference into the present application.

The arrow A shown in FIG. 2 is a direction in which the printing paper P is conveyed. The arrow B is a direction orthogonal to the conveying direction A of the printing paper P. In FIG. 2, only eight nozzles 100a to 100h are shown. However, many more nozzles 100 are actually formed in the head main body 12a. The nozzles 100a to 100h are mutually offset in the B direction. Ink droplets are discharged from the nozzles 100a to 100h while the printing paper P is being moved in the A direction. The positional relationship of the nozzles 100a to 100h and the printing paper P does not change in the B direction. One row of dots aligned in the A direction of the printing paper P is formed by the ink droplets discharged from one nozzle (for example, 100a. Eight rows of dots can be formed by the eight nozzles 100a to 100h shown in FIG. 2. Each nozzle 100 is connected with a pressure chamber (not shown). A piezoelectric element (not shown) faces the pressure chamber. Pulse signals are supplied to the piezoelectric element, whereupon the piezoelectric element deforms, and pressure of the ink in the pressure chamber is increased or decreased. The ink droplets are thus discharged from the nozzle. The pressure chambers, piezoelectric elements, etc. are described in detail in the aforementioned U.S. Pat. No. 4,633,268.

Returning to FIG. 1, the description of the configuration of the printer 2 will be continued. The printer 2 comprises a maintenance unit 14. The maintenance unit 14 has four caps 15a to 15d for covering the lower faces of the four head main bodies 12a to 12d. Further, the maintenance unit 14 comprises a purge mechanism (not shown).

The maintenance unit 14 waits in a position (the position shown in FIG. 1) below the paper supply portion 4 while the printer 2 is performing the printing operation. When the printing operation has not been performed for a predetermined period, a power source of the printer 2 is turned off and the maintenance unit 14 moves to the right. The caps 15a to 15d cover the lower faces of the head main bodies 12a to 12d.

When the maintenance unit 14 is to be moved to the right from the position shown in FIG. 1, the cylindrical member 17 is rotated and the chassis 16 is thus lowered. When the chassis 16 is lowered, the pair of belt rollers 7a and 7b, the belt 8, and the guide 9 are also lowered.

Figure 3:
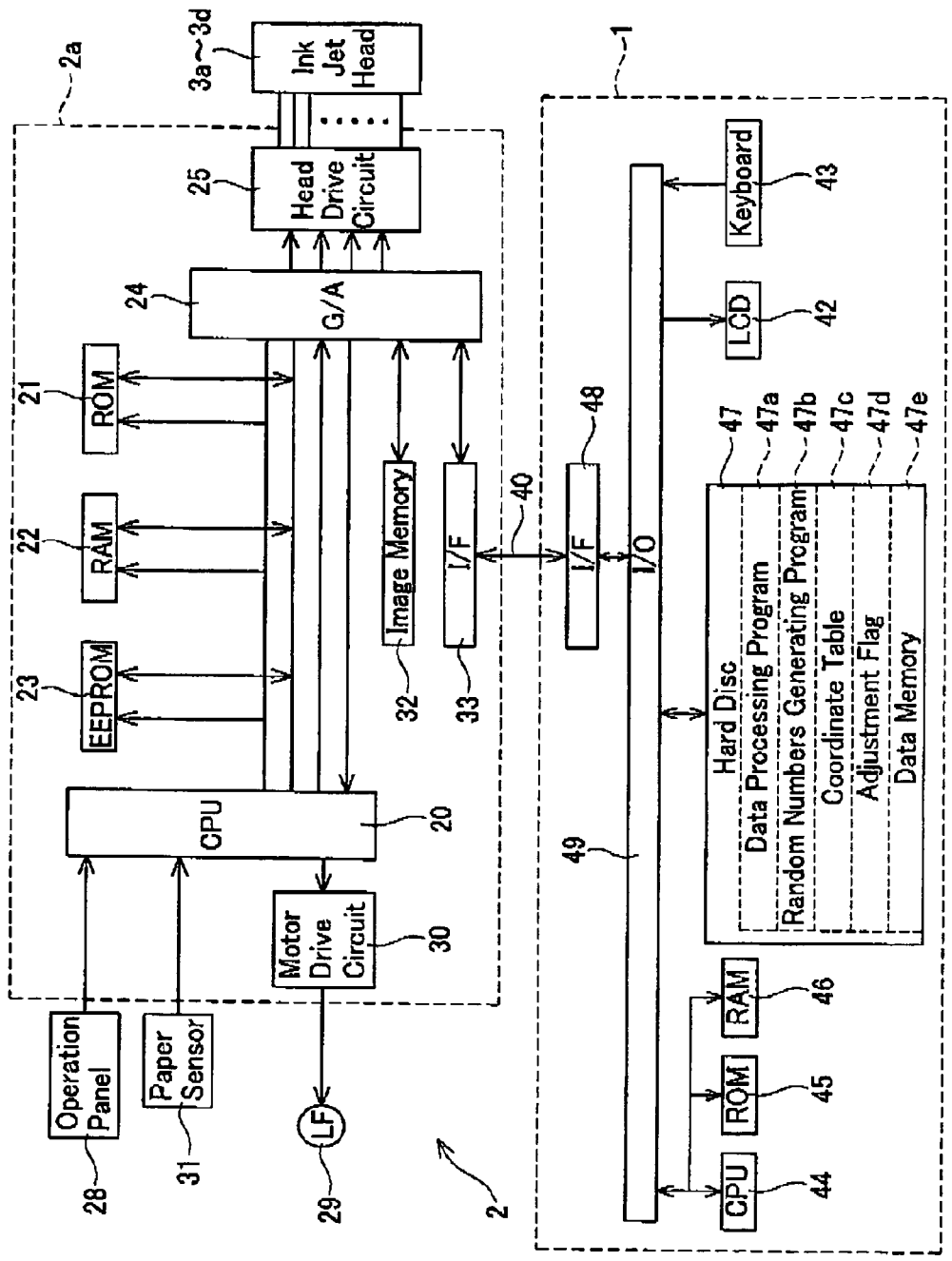
FIG. 3 shows a schematic view of the configuration of an electrical circuit of the ink jet printer and the personal computer.

Next, the configuration of an electrical circuit of the PC 1 and the printer 2 will be described. FIG. 3 shows a simplification of the configuration of the electrical circuit of the PC 1 and the printer 2.

First, the configuration of the electrical circuit of the printer 2 will be described. The printer 2 has a control board 2a. The control board 2a comprises a CPU 20, a ROM 21, a ELM 22, an EEPROM 23, a gate array (G/A) 24, a head drive circuit 25, a motor drive circuit 30, an image memory 32, an interface (I/F) 33, etc. The CPU 20, ROM 21, RAM 22, EEPROM 23, and the gate a=ay 24 are all connected in a manner allowing communication via a bus line. The motor drive circuit 30 is connected to the CPU 20. The head drive circuit 25, the image memory 32, and the I/F 33 are connected to the gate array 24.

The CPU 20 is a one chip type microcomputer that executes control programs. The CPU 20 creates print timing signals and reset signals. These signals are output to the gate array 24. The ROM 21 stores the control programs to be executed by the CPU 20, as well as fixed value data. The RAM 22 temporarily stores data. The EEPROM 23 stores data The gate array 24 inputs the print timing signals output from the CPU 20. The gate array 24 creates signals based on print data (to be described: the print data is stored in the image memory 32) and the print timing signals. For example, the gate array 24 creates driving signals for driving the ink jet heads 3a to 3d. Further, the gate array 24 creates a conveying clock synchronized with the driving signals. The gate array 24 further creates latching signals and parameter signals. Ee signals created by the gate array 24 are output to the head drive circuit 25. Further, the gate array 24 stores the print data input into the interface (I/F) 33 in the image memory 32.

The head drive circuit 25 drives the ink jet heads 3a to 3d based on the signals output from the gate array 24. Specifically, the head driver circuit 25 supplies pulse signals to the piezoelectric elements of the ink jet heads 3a to 3d. The timing at which the pulse signals are supplied, and the number of pulse signals supplied, are determined based on the signals output by the gate array 24. When one pulse signal is supplied to the piezoelectric element, one ink droplet is discharged from the nozzle 100 that corresponds to this piezoelectric element. With the printer 2 of the present embodiment, the number of pulse signals for forming one dot on the printing paper P can be varied. For example, one dot can be formed by supplying only one pulse signal to the piezoelectric element. In this case, a small dot is formed. Further, one dot can be formed by supplying two continuous pulse signals to the piezoelectric element. In this case, one dot is formed from two ink droplets and a medium dot is formed. One dot can be formed by supplying three continuous pulse signals to the piezoelectric element. In this case, one dot is formed from three ink droplets, and a large dot is formed. In the present embodiment, in the case where one dot of the same color is formed in a predetermined area, the ratio of optical density of the large, medium, and small dots is 50:25:10. If the reflection rate of the predetermined area in which the dots are formed is R, the optical density can be defined as $D=\log_{10}(1/R)$. The optical density is generally proportional to the number of dots. The optical density when one large dot is formed in the predetermined area is similar to the optical density when two medium dots are formed in the predetermined area. Here, similar includes the case where these are the same. The range of similarity is determined by experiments, etc.

The image memory 32 stores the print data (to be described). The print data is created by the PC 1. The I/F 33 inputs the print data output from the PC 1.

The motor drive circuit 30 drives the motor 29 based on the pulses output from the CPU 20. The belt rollers 7a and 7b, and the belt 8 thus rotate.

The CPU 20 is connected with devices 28 and 31 that are disposed to the exterior of the control board 2a. The device 28 is an operation panel. The device 31 is a paper sensor. The user can utilize the operation panel 28 to input instructions. The instructions that have been input are fetched to the CPU 20. The paper sensor 31 detects a tip position of the printing paper P that is being supplied from the paper supply portion 4 (see FIG. 1). The paper sensor 31 outputs the detection signals to the CPU 20. The CPU 20 determines the timing at which ink will be discharged from the nozzles 100 based on the detection signals output from the paper sensor 31.

Next, the configuration of an electrical circuit of the PC 1 will be described. The PC 1 comprises the LCD 42, the keyboard 43, a CPU 44, a ROM 45, a RAM 46, a hard disc 47, an interface (I/F) 48, an I/O interface (I/O) 49, etc. The CPU 44 is connected to the ROM 45 and the RAM 46 via a data bus. The hard disc 47, LCD 42, and keyboard 43 are each connected with the I/O 49. The I/O 49 is connected with the interface 48.

The CPU 44 executes programs stored in the ROM 45 and the hard disc 47, etc. The ROM 45 stores the programs to be executed by the CPU 44. The RAM 46 temporarily stores data. The hard disc 47 is a reloadable non-volatile memory. The hard disc 47 comprises a data processing program 47a, a random numbers generating program 47b, a coordinate table 47c, an adjustment flag 47d, a data memory 47e, etc. These programs 47a to 47e were stored in a memory medium (for example, a CD-ROM) that is an accessory of the printer 2. The user installs the programs 47a to 47e on the PC 1. The hard disc 47 stores the programs 47a to 47e that have been installed.

The programs 47a to 47e will be described in detail later. Here, a simple description thereof will be given. The data processing program 47a is a program for executing processes shown in the flowcharts (to be described) of FIG. 5 and FIG. 6. The random numbers generating program 47b is a program for generating random numbers (to be described). The coordinate table 47c stores combinations of the random numbers and sub-coordinates (to be described). The adjustment flag 47d is a flag showing whether the user has chosen adjusted mode. If the user has chosen the adjusted mode, the adjustment flag 47d is maintained at '1' (an ON state). If the user has not chosen the adjusted mode (if normal mode has been chosen), the adjustment flag 47d is maintained at '0' (an OFF state). The data memory 47e stores bit-mapped data (to be described), pixel data, the print data, etc.

The I/F 48 is connected with the I/F 33 of the printer 2 via the communication cable 40. The PC 1 can output the print data to the printer 2 via the I/F 48 and the I/F 33. The I/O 49 communicates data between the IF 48, the CPU 44, etc.

Figure 4:
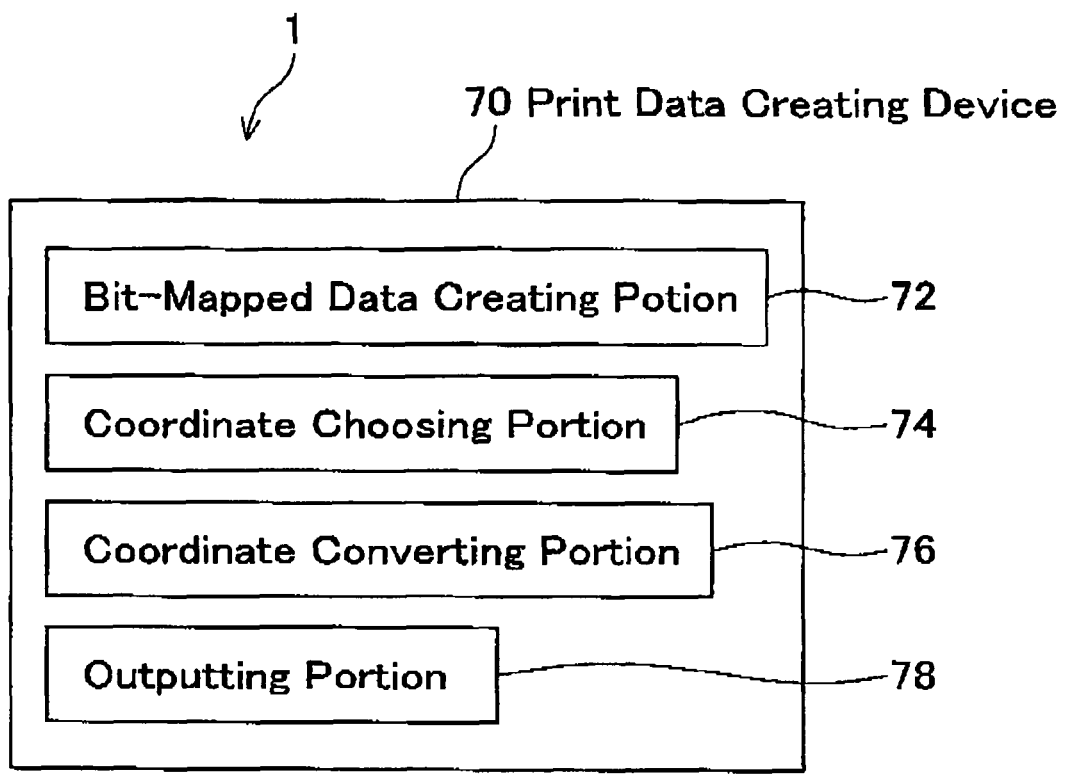
FIG. 4 snows functions realized by the personal computer.

The PC 1 realizes the functions for creating the print data by utilizing the devices 42 to 49. FIG. 4 shows, in a simplified manner, the functions realized by the PC 1. FIG. 4 shows the configuration of a print data creating device 70 realized by the PC 1. The print data creating device 70 comprises a bit-mapped data creating portion 72, a coordinate choosing portion 74, a coordinate converting portion 76, and an outputting portion 78. The functions of the portions 72 to 78 are described later in detail using the flowcharts of FIG. 5 and FIG. 6. Here, the functions of the portions 72 to 78 will be described simply. The bit-mapped data creating portion 72 executes the function of converting an image displayed on, for example, the LCD 42 into bit-mapped data. Further, the bit-mapped data creating portion 72 executes the function of enlarging or reducing the bit-mapped data so that it will match the resolution of the printer 2. Moreover, the bit-mapped data creating portion 72 executes the function of adjusting color information of the bit-mapped data. The coordinate choosing portion 74 chooses coordinates at which dots will be formed from all the coordinates of the bit-mapped data. The coordinate converting portion 76 converts the coordinates chosen by the coordinate choosing portion 74 into sub-coordinates. The outputting portion 78 outputs, to the printer 2, the print data that includes information showing the sub-coordinates chosen by the coordinate converting portion 76.

Figure 5:
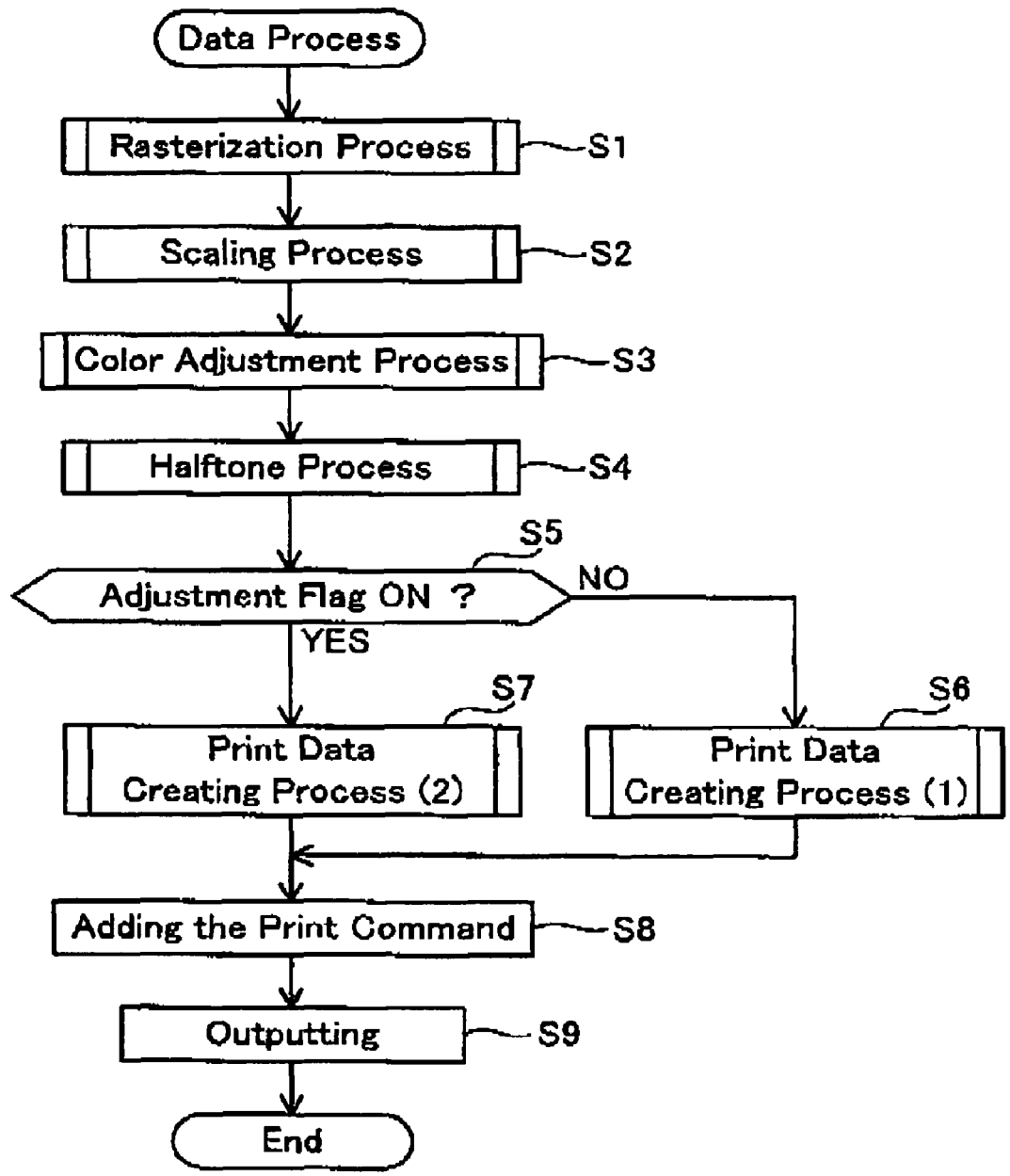
FIG. 5 shows a flowchart of a data process.

The data process executed by the PC 1 will be described with reference to FIG-5. FIG. 5 shows a flowchart of the data processes for creating and outputting the print data. The data process is executed by the print data creating device 70 of FIG. 4.

The user can designate and instruct printing of desired image data (this includes text data). The user can input the instruction using the keyboard 43. When the instruction is input, the data processing program 47a shown in FIG. 3 is executed, and the processes shown in FIG-5 are thus executed. When printing is to be instructed, the user can choose a print mode. There are two print modes; normal mode and adjusted mode. If normal mode has been chosen, the adjustment flag 47d of FIG. 3 is '0' (OFF). If adjusted mode has been chosen, the adjustment flag 47d is '1' (ON).

The print data creating device 70 first executes a rasterization process on the image data instructed by the user (S1). The image data is thus converted into bit-mapped data. The bit-mapped data comprises a plurality of pixel data. Each pixel datum is a combination of a coordinate obtained by dividing the image data into a matrix shape and color information at this coordinate. The color information is represented by color density (this may be termed a gradation value) for each of the four colors (cyan (C), magenta (H), yellow (Y), and black (K)). As a result, one pixel datum includes a combination of one coordinate, C color density, M color density, Y color density, and K color density. In the case where image data in which bit-mapped data has already been created is to be printed, the process of S1 can be skipped.

Next, the bit-mapped data created in S1 is enlarged or reduced (S2). The bit-mapped data is thus rewritten to match the resolution of the printer 2. In the present embodiment, the bit-mapped data is converted to a resolution of 600 dpi (dot per inch)×600 dpi for printing. Here, the coordinates before rewriting are rewritten into coordinates that match the aforementioned resolution.

The process of S2 creates the need to adjust the color information of the pixel data that has been rewritten. The color information of the pixel data that has been rewritten must be determined such that, as far as possible, there is no loss of the color information of the pixel data prior to rewriting. The process of S3 is executed to achieve this. The contents of the process of S3 are taught in, for example, U.S. Pat. No. 6,757,076. The contents thereof may be incorporated by reference into the present application.

When the process of S3 is completed, the bit-mapped data in which the color information has been adjusted is created. This bit-mapped also includes a plurality of pixel data. Each pixel datum includes a combination of one coordinate, C color density, M color density, Y color density, and B color density.

The processes of S1 to S3 are executed by the bit-mapped data creating portion 72 of FIG. 4.

Next, a halftone process is executed (S4). Here, the coordinates at which the dots will be formed are chosen from the bit-mapped data. This process is executed based on the color information (the color density of the four colors) of the pixel data. An example of the process of S4 is given below. The color density of each of tee four colors included in the color information of the pixel data is compared with a predetermined threshold by the print data creating device 70. For example, in the case where the color density is represented by any density from 0 to 255, 128 can be adopted as the threshold. If, for example, the C color density included in the pixel datum is 200, the coordinate (for example, (x1, y1)) included in that pixel datum is chosen. In this case, information in which the chosen coordinate (x1, y1) and cyan are matched is stored. Specifically, the combination of the coordinate (x1, y1), cyan, and the flag '1' is stored in the data memory 47e of FIG. 3. As another example, if the magenta color density combined with the coordinate (x1, y1) is 100, the combination of the coordinate (x1, y1), magenta, and the flag '0' is stored. Below, flag '1' may represent the flag being ON, and flag '0' may represent the flag being OFF. If at least two color densities included in one pixel datum exceed the threshold, the flag is turned ON for the color that has the greatest color density, and the flag is turned OFF for the other colors. For example, if certain pixel datum is a combination of the coordinate (x1, y1), C color density of 200, M color density of 100, Y color density of 150, and K color density of 50, then the following combinations are created: the combination of the coordinate (x1, y1), cyan, and the flag '1'; the combination of the coordinate (x>1, y1), magenta, and the flag '0'; the combination of the coordinate (x1, y1), yellow and the flag '0'; and the combination of the coordinate (x1, y1), black, and the flag '0'. Furthermore, if at least two color densities included in one pixel datum exceed the threshold, the flags corresponding to the two colors may both be turned ON.

If the gradation value (color density) for all of the four colors combined with one coordinate is smaller than 128, all the four flags corresponding to that coordinate are turned OFF. In this case, that coordinate has not been chosen in S4.

When the above process has been executed on all the pixel data, and the coordinates at which the dots are to be formed have been chosen, the process proceeds to S5. Below, one item of information corresponding to one flag (the information of the combination of coordinate, color, and '1' or '0') is also termed one pixel datum. Consequently, when the process of S4 is executed, a plurality of items of pixel data is created. The plurality of items of pixel data created in S4 is termed two value data.

The process described above is one example of the halftone process, and this example does not necessarily have to be executed. For example, the error diffusion method or the dither method may equally well be utilized. These methods are taught in, for example, U.S. Pat. Nos. 4,760,460 and 4,521,805. The contents thereof may be incorporated by reference into the present application.

Moreover, the halftone process is not restricted to having the two values of the flag being an or off. The halftone process can be quantized to three or more.

The halftone process of S4 is executed by the coordinate choosing portion 74 of FIG. 4.

In S5, it is determined whether the adjustment flag 47d (see FIG. 3) is ON. As described above, the adjustment flag 47d is turned ON ('1' is being stored) when the user has chosen the adjusted mode, and the adjustment flag 47d is turned OFF ('0' is being stored) when the user has chosen the normal mode. When the adjustment flag 47d is OFF (NO in S5), the process proceeds to S6.

In S6, the print data is created based on the two value data (a plurality of items of pixel data) created by the halftone process (S4). In this print data, the information concerning the size of the dot is added to the information having each pixel data in which the flag is '1' (the combination of the coordinate, color (any out of CMYK) and the flag '1'). In S6, a large dot has been adopted, and information having the combination of the coordinate, the color, the flag '1' and a large dot is thus created. This process is executed for each item of pixel data in which the flag is '1'. The print data includes a plurality of combinations of the coordinate, the color, the flag '1' and the large dot. Further, the print data includes a plurality of combinations of the coordinate, the color, and the flag '0'. Below, the print data created in S6 will be termed easy print data. Below, the combination of the coordinate, the color, the flag '1' and the large dot (or the combination of the coordinate, the color, and the flag '0') is also termed one pixel datum.

When the easy print data has been created in S6, a predetermined print command is added (S8). The print command is a command for instructing the printer 2 to perform the printing operation according to the setting.

When S8 has been completed, the easy print data to which the print command has been added is output to the printer 2 (S9). The process of S9 is executed by the outputting portion 78 of FIG. 4.

The printer 2 inputs the easy print data output from the PC 1, and executes the printing operation based on the easy print data. The printer 2 discharges ink from the nozzles based on the easy print data. Specifically, the printer 2 supplies the pulse signals to the piezoelectric elements based on the easy print data. For example, in the case where the easy print data includes the combination of the coordinate (x2, y2), cyan, the flag '1', and a large dot, the printer 2 supplies the pulse signals to the piezoelectric element such that a large cyan dot will be formed at the coordinate (x2, y2) of the printing paper P. In the present embodiment, three continuous pulse signals are supplied to the piezoelectric element in order to form one large dot.

The printer 2 does not form a dot of the color combined with the flag '0' at the coordinates combined with the flag '0'. For example, in the case where the easy print data includes the combination of the coordinate (x3, y3), black, and the flag '0', the printer 2 does not form a black dot at the coordinate (x3, y3). The printer 2 forms dots at the coordinates based on the pixel data included in the easy print data. The image instructed by the user is thus printed on the printing paper P.

Figure 6:
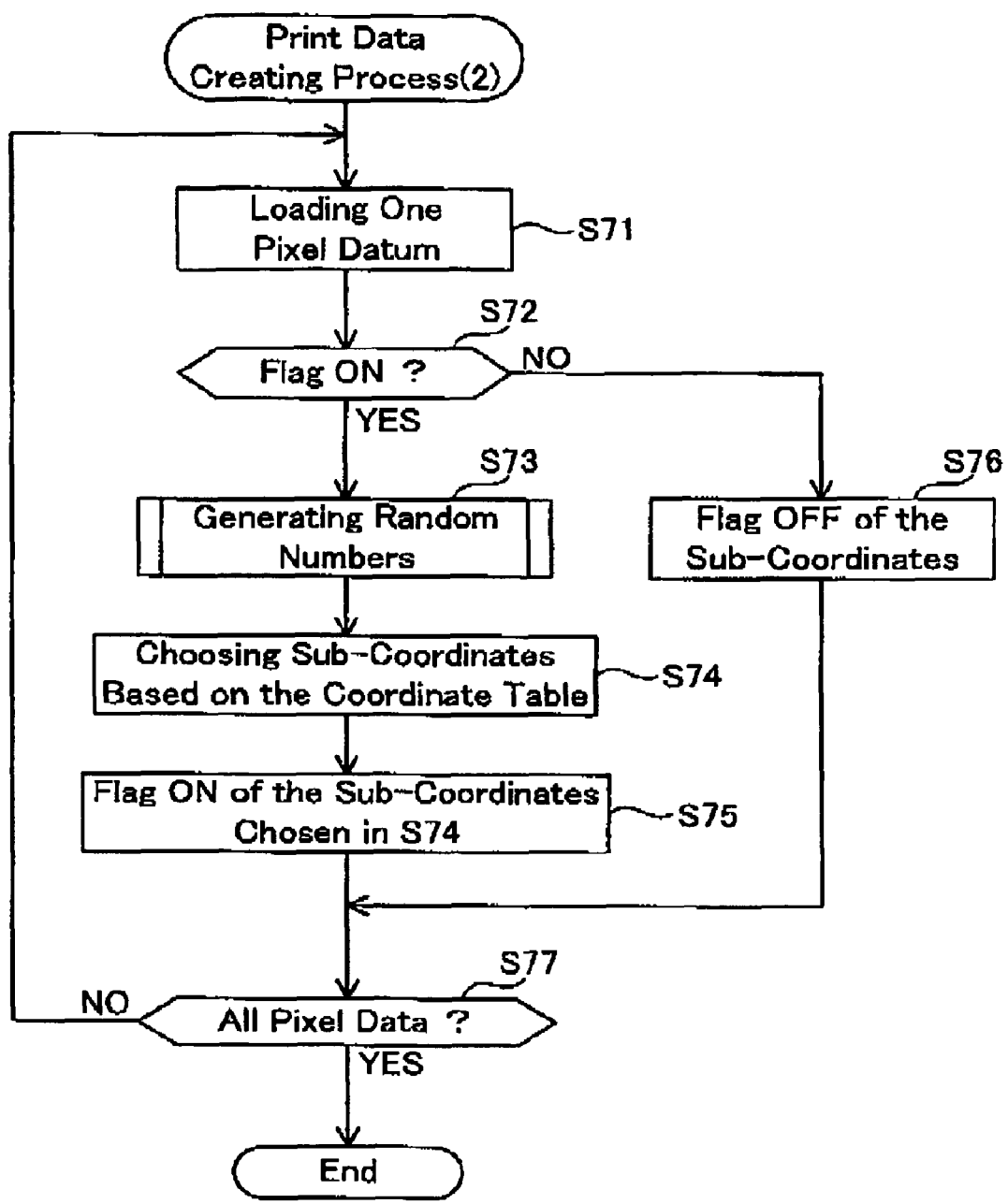
FIG. 6 shows a flowchart of a print data creating process.

Alternatively, in the case where it is determined in S5 that the adjustment flag 47d is ON (YES in S5), the process of S7 is executed. In S7, print data is created using a method different from the method in S6. The process of S7 is executed by the coordinate converting portion 76 of FIG. 4. The print data creating process of S7 will be described with reference to FIG. 6. FIG. 6 shows a flowchart of the print data creating process of S7.

First, one pixel datum included in the two value data created in S5 is loaded (S71). Next, it is determined whether the flag is '1' (the flag is ON) of the pixel datum that has been loaded (S72). If the flag is ON of the pixel datum that was loaded (YES in S72), random numbers are generated (S73). These random numbers can be obtained by executing the random numbers generating program 47b of FIG. 3. In S73, one random number is chosen out of six random numbers: 0, 1, 2, 3, 4, 5.

Next, two sub-coordinates are chosen (S74) based on the random number chosen in S73. The sub-coordinates are coordinates located in the neighborhood of the coordinate of the pixel datum that was loaded in S71. The coordinates that are adopted as the sub-coordinates may include or exclude the coordinate of the pixel datum.

Figures 7, 8:
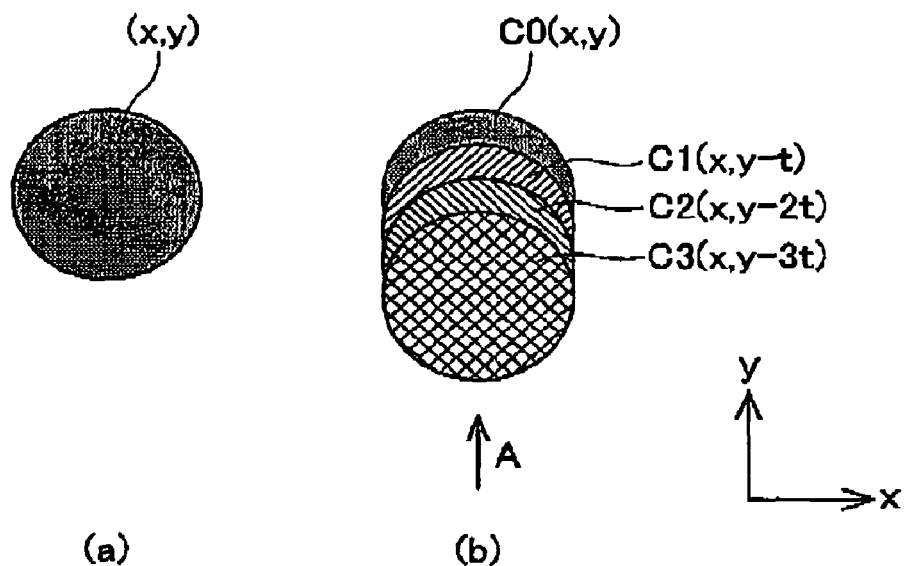
FIG. 7 (a) shows one coordinate.
FIG. 8 shows the contents of a coordinate table.

The sub-coordinates will be described with reference to FIG. 7. FIG. 7 (a) shows a coordinate (x, y) included in one pixel datum. In FIG. 7, one coordinate is represented by one dot. FIG. 7 (b) shows four sub-coordinates C0 to C3 corresponding to the coordinate (x, y). In FIG. 7(b), each dot corresponding to the four sub-coordinates C0 to C3 has been given a different pattern. However, these types of different pattern are not formed when the dots are actually formed. The direction A in the figure is the direction in which the printing paper P moves relative to the ink jet heads 3a to 3d. The sub-coordinate C0 (x, y) of the present embodiment is the same as the coordinate included in the pixel datum. The sub-coordinates C0 to C3 are aligned in the A direction. That is, the sub-coordinates C0 to C3 are aligned in the direction in which the printing paper P moves relative to the ink jet heads 3a to 3d. A small number is adopted as 't' shown in FIG. 7 (b). As a result, if dots were to be formed at all of the sub-coordinates C0 to C3, the major part of each dot would overlap with the adjacent dot.

FIG. 8 shows the contents of the coordinate table 47c (see FIG. 3). As shown in FIG. 8, the coordinate table 47c stores combinations of the random number and two sub-coordinates.

In the process S74 of FIG. 6, two sub-coordinates combined with the random number obtained in S73 are chosen. For example, in the case where the random number 3 was obtained in S73, two sub-coordinates C1 and C2 are chosen. Then, the flags corresponding to the two sub-coordinates chosen in S74 are turned ON (S75). In S75, information that is a combination of the sub-coordinate that was chosen, the color, the flag '1', and a medium dot is created. For example, in the case where the two sub-coordinates C1 and C2 have been chosen from the pixel datum that has the combination of the coordinate, cyan, and the flag '1', the following combinations are created: a combination of the sub-coordinate C1, cyan, the flag '1', and a medium dot; and a combination of the sub-coordinate C2, cyan, the flag '1', and a medium dot. Since two sub-coordinates are chosen from one pixel datum, two combinations of the chosen sub-coordinate, color, the flag '1', and a medium dot are created. In the process of S75, the coordinate that is included in the one pixel datum is converted into two sub-coordinates. On the other hand, the flags that correspond to the sub-coordinates that were not chosen in S75 are turned OFF. That is, two combinations of the sub-coordinate that were not chosen, the color, and the flag '0' are created. The information created in S75 is stored in the data memory 47e (see FIG. 3).

In the case where the flag is '0' (the flag is OFF) of the pixel datum in S72 (NO in S72), the process proceeds to S76. In S76, the flags are turned OFF for four sub-coordinates that correspond to the coordinate of the pixel datum. In the case where, for example, the process of S76 is executed based on the pixel data having the combination of the coordinate, black, and the flag '0', each of the four sub-coordinates obtained from that coordinate is a combination of the sub-coordinate, black, and the flag '0'. The information created in S76 is also stored in the data memory 47e.

When the process of S75 or S76 has been executed, the process proceeds to S77. In S77, it is determined whether all the processes S71 to S76 have been executed for all the pixel data included in the two value data. If NO is determined in S77, the process returns to S71. In S71, pixel datum for which the processes have not been executed is loaded. In the case where the processes have been executed for all the pixel data (YES in S77), the process proceeds to SR of FIG. 5.

Each coordinate of the pixel data that includes the flag '1' is converted into two sub-coordinates by executing the processes S71 to S77, and the print data is thus created. Below, the combination of the sub-coordinate, the color, the flag '1' and a medium dot (or the combination of the sub-coordinate, the color, and the flag '0') will also be termed pixel datum.

In S8, the print command is added to the print data created in S7. Thereupon, the print data with the print command added thereto is output to the printer 2 (S9).

When the print data output from the PC 1 has been input to the printer 2, the printer 2 executes the printing operation based on the print data. The printer 2 supplies pulse signals to the piezoelectric elements based on the print data. For example, in the case where the print data includes the combination of the sub-coordinate (x3–t, y3–t), magenta, the flag '1', and a medium dot, and the combination of the sub-coordinate (x3–3 t, y3–3 t), magenta, the flag '1', and a medium dot, medium magenta dots are formed at the coordinates (x3–t, y3–t) and (x3–3 t, y3–3 t) of the printing paper P. Two continuous pulse signals are supplied to the piezoelectric elements in order to form the medium dots. The printer 2 does not form dots of the color combined with the flag '0' at the sub-coordinates that are combined with the flag '0'. For example, in the case where the print data includes the combination of the coordinate (x3, y3), magenta, and the flag 'O', and the combination of the coordinate (x3–2 t, y3–2 t), magenta, and the flag '0', magenta dots are not formed at the coordinates (x3, y3) and (x3–2 t, y3–2 t). The printer 2 forms dots at the coordinates based on the print data, and the image instructed by the user is thus printed on the printing paper P.

Figure 9:
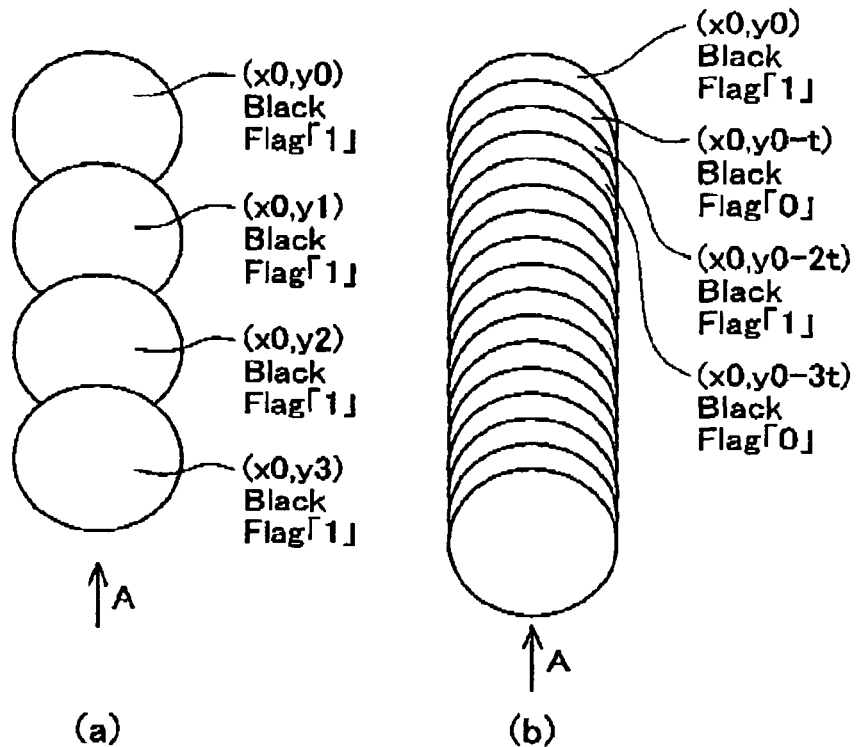
FIG. 9 (a) shows a schematic simplified view of the contents of easy print data created in the case where normal mode has been chosen.

The easy print data created when the normal mode has been chosen, and the print data created when the adjusted mode has been chosen, will now be described with reference to FIG. 9. FIG. 9 (a) shows an example of the easy print data created in the case where the normal mode has been chosen. FIG. 9 (b) shows an example of the print data created in the case where the adjusted mode has been chosen.

As shown in FIG. 9, when the adjusted mode has been chosen, a number of the pixel datum has been four times in the A direction compared to the case where the normal mode was chosen. When the adjusted mode has been chosen, the printing operation is executed such that resolution is four times greater in the A direction. If the easy print data and the print data are each created based on the sane image, the vertical and horizontal size of the age that was printed on the basis of the easy print data will be the same as that of the image that was printed on the basis of the print data. The resolution between the normal mode and the adjusted mode can be adjusted by, for example, controlling the conveying speed of the printing paper P or, for example, by adjusting the timing for driving the piezoelectric elements.

Figure 10:
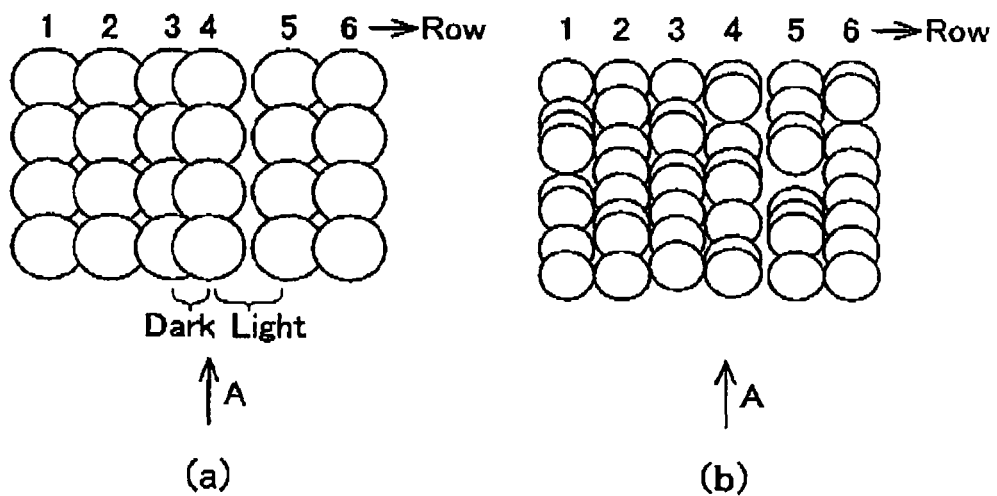
FIG. 10 (a) shows a dot pattern created in the case where the normal mode has been chosen.
Figure 12:
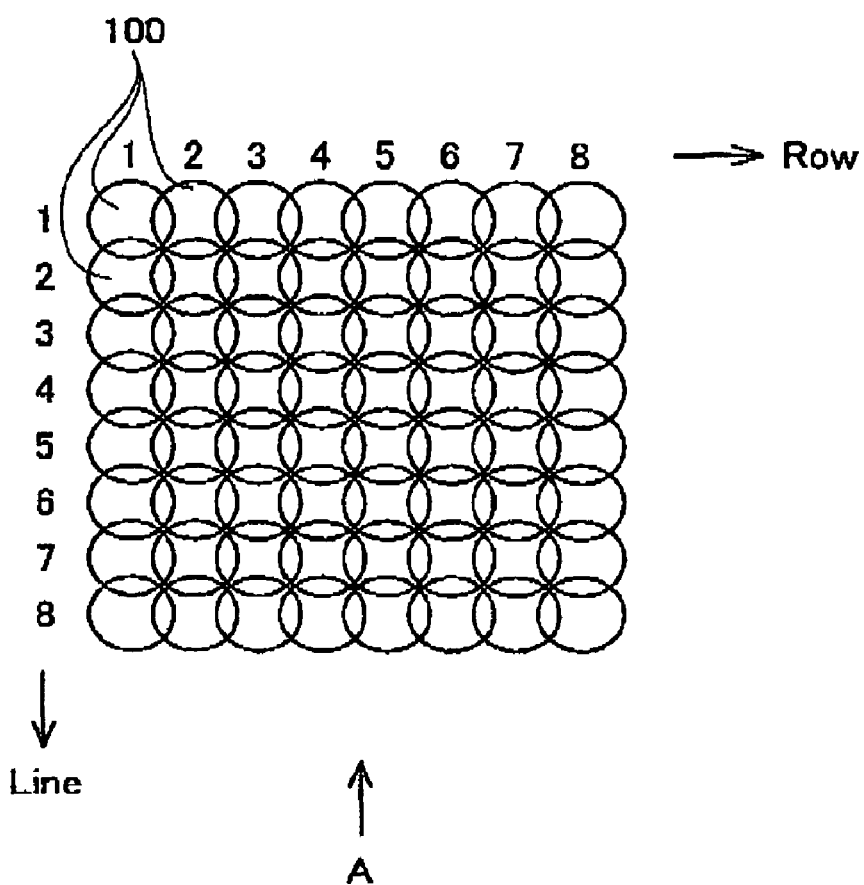
FIG. 12 shows dots formed on a print medium.
Figure 13:
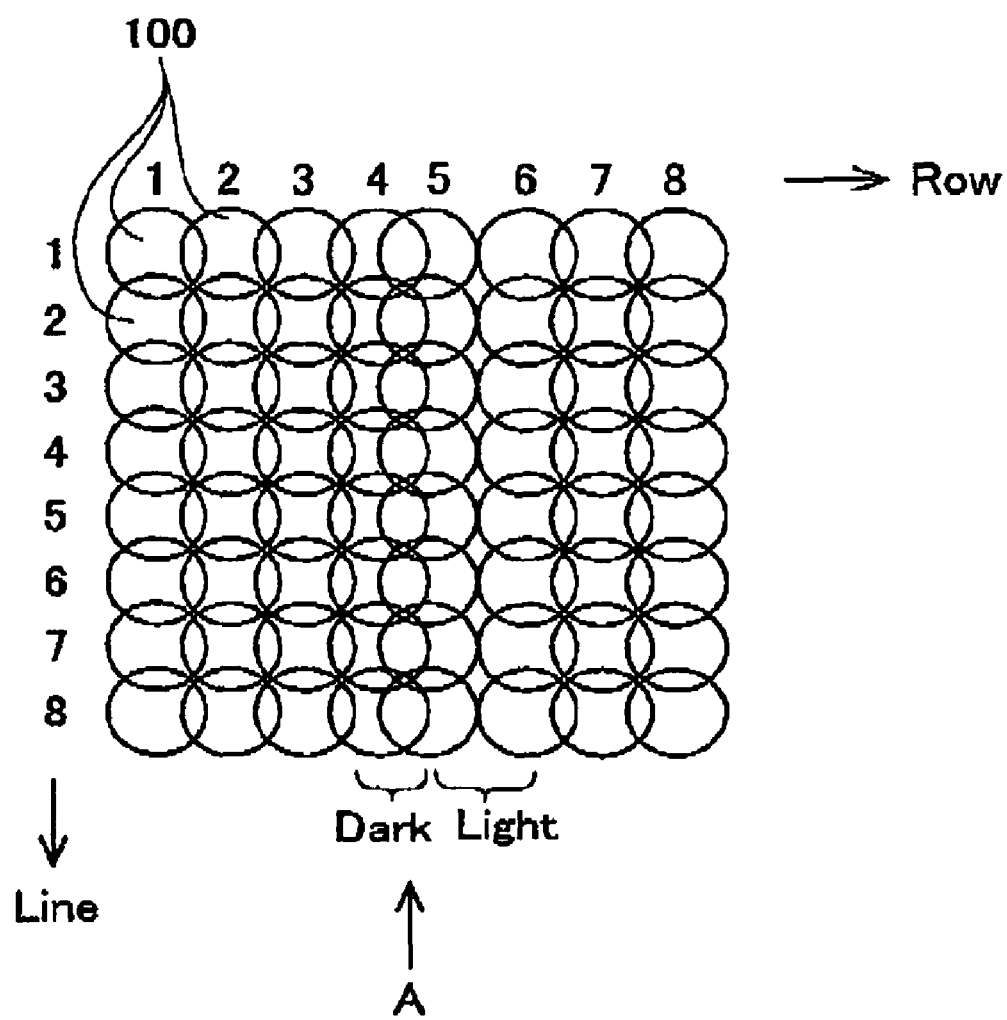
FIG. 13 shows a state where one dot row has been displaced.
Figure 14:
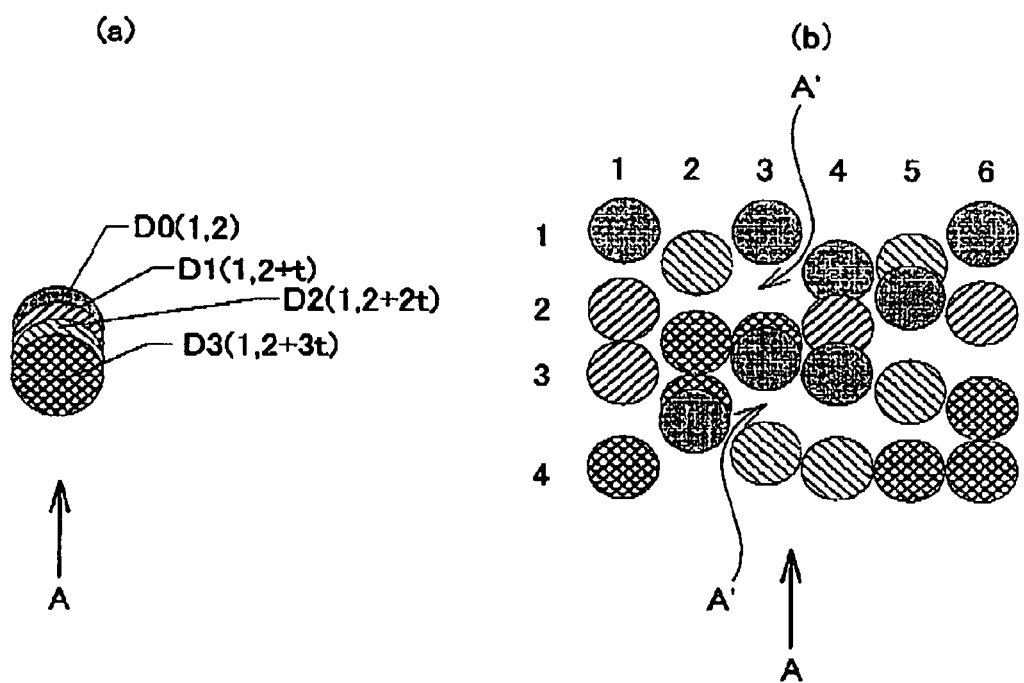
FIG. 14 (a) schematically shows four sub-coordinates.

Dot patterns formed by the printer will be described with reference to FIG. 10. FIG. 10 (a) shows an example of 24 dots formed on the basis of the easy print data FIG. 10 (b) shows an example of 48 dots formed on the basis of the print data. These easy print data and the print data were created from the same bit-mapped data.

In the example in FIG. 10 (a), a fourth dot row is slightly displaced towards the left. In this case, there is a major overlap between the third dot row and the fourth dot row. The overlapping region is darker and extends in the A direction. By contrast, there is no overlap between the fourth dot row and the fifth dot row, and consequently there is a lighter region that extends in the A direction. The array pattern of the dots in the y direction (the A direction) is regular. As a result, dark portions and light portions are periodically repeated in the dark region between the third dot row and the fourth dot row.

Further, dark portions and light portions are periodically repeated in the light region between the fourth dot row and the fifth dot row.

In the example in FIG. 10 (b), the dots are formed randomly in the A direction. As a result, dark portions and light portions are not periodically repeated in the dark region between the third dot row and the fourth dot row. Further, dark portions and light portions are not periodically repeated in the light region between the fourth dot row and the fifth dot row.

Furthermore, in the example of FIG. 10 (b), dots have been formed at two of the four extending sub-coordinates. Consequently, it is more possible to prevent there being a greater distance between two adjacent dots than in the case where a dot was formed at one sub-coordinate of the four extending sub-coordinates.

Further, if the adjusted mode is chosen, two medium dots are formed in the region in which one large dot is formed in the case of the normal mode. One large dot and two medium dots have similar optical density.

Modifications to the aforementioned embodiment will now be described.

(1) In the aforementioned embodiment, two sub-coordinates were chosen from the four extending sub-coordinates. However, the number of extending sub-coordinates can be varied, and can be any number greater than three. In the case where there are n number of extending sub-coordinates, any number of sub-coordinates can be chosen as long as these are more than two and less than n (hereafter these sub-coordinates are termed chosen sub-coordinates). Further, in the present embodiment, the large dots are formed using the easy print data, and the medium dots are formed using the print data. However, the size of the dots may be varied.

FIG. 11 shows combinations of the number of chosen sub-coordinates and the size of the dots. For example, in example 1 of FIG. 11, two chosen sub-coordinates have been adopted, and a combination of a small dot and a small dot has been adopted. Further, in example 5, three chosen sub-coordinates have been adopted, and a combination of a small dot, a small dot, and a medium dot has been adopted.

(2) As shown in the examples 8 to 10 of FIG. 11, dots may be formed at all the n number (for example, four) of extending sub-coordinates. In this case, it is preferred that at least one sub-coordinate is chosen from the n number of sub-coordinates. It is preferred that the size of the dots formed at the chosen sub-coordinates differs from the size of the dots at the sub-coordinates that have not been chosen. For example, in example 8 of FIG. 11, a medium dot is formed at one sub-coordinate chosen from the four sub-coordinates. Small dots are formed at the remaining sub-coordinates not chosen from the four sub-coordinates. Moreover, it is preferred that, in order to execute this example, a process is executed such that the combination of chosen sub-coordinate, the color, the flag '1', and a medium dot is created in S75 of FIG. 6. Further, the combination of non-chosen sub-coordinate, the color, the flag '1', and a small dot is created. The present variant (3) Only the medium dots are formed if the adjusted mode has been chosen. However, differing dots may equally well be formed. For example, in the case where three pixel data (a first pixel datum, a second pixel datum, and a third pixel datum) are present in the print data, the first pixel datum may be a combination of coordinate, the color, the flag '1', and a large dot, the second pixel datum may be a combination of coordinate, the color, the flag 'i', and a medium dot, and the third pixel datum may be a combination of coordinate, the color, the flag '1', and a small dot.

(4) In the above embodiment, the PC 1 creates the print data. However, the print data creating device 70 (see FIG. 4) may equally well be mounted in the printer 2. In this case, the following representative examples are possible.

For example, the printer 2 may equally well have a scanner function and be capable of printing scanned images. In this case, the printer 2 creates print data from the bit-mapped data obtained from the scanned image, and executes the printing operation based on the print data that has been created.

Further, the PC 1 may output the two value data obtained at step S4 (see FIG. 5) to the printer 2. The printer 2 may create the print data based on the two value data output from the PC 1.

(5) A computing device other than the PC 1, such as a tablet, a PDA, etc. may be adopted as the print data creating device.

(6) As shown in FIG. 3, the PC 1 and the printer 2 are connected by a cable 40. However, a wireless connection may be adopted instead of the cable 40

(7) Although the aforementioned printer 2 is a line type printer, a serial type printer in which the ink jet head itself is capable of moving may be adopted. The print data creating device 70 may equally well create print data utilized by the serial type printer.

(8) The aforementioned coordinates need not be represented in the form of coordinates. For example, the coordinates can be represented by a combination of the nozzle number of the ink jet printer and the timing with which the ink is discharged.

(9) In the aforementioned embodiment, the coordinates at which the dots will be formed are chosen from the bit-mapped data, and then the chosen coordinates are converted into the sub-coordinates. However, the process may equally well be executed in the following sequence.

The bit-mapped data obtained in S3 of FIG. 5 will be termed first bit-mapped data. The first bit-mapped data is converted into second bit-mapped data. The conversion process is executed as follows: the first bit-mapped data includes a plurality of combinations of a coordinate and the color densities of the colors (CMYK). Each of the coordinates of the first bit-mapped data is converted into two sub-coordinates. For example, if the first bit-mapped data includes J number of coordinates, 2×J number of sub-coordinates are obtained. These two sub-coordinates can be obtained by executing the processes of S73 and S74 of FIG. 6. The second bit-mapped data includes a plurality of combinations of the sub-coordinate and the color densities of the colors that were combined with the coordinate that were converted into the sub-coordinate. For example, in the case where the sub-coordinates (x1−t, y1−t), (x1−2 t, y1−2 t) have been obtained from the pixel datum having the combination of coordinate (x1, y1) and the color densities (C100, M50, Y50, K150), the second bit-mapped data includes the combination of the sub-coordinate (x1−t, y1−t) and the color densities (C100, M50, Y50, K150), and the combination of the sub coordinate (x1−2 t, y1−2 t) and the color densities (C100, M50, Y50, K150).

When the second bit-mapped data is created, the halftone process of S4 of FIG. 5 is executed. The sub-coordinates at which the dots will be formed are thus chosen, and the print data is thus created. The print data includes a plurality of combinations of the chosen sub-coordinate, color, the flag '1', and the size of the dot. In the above example, the print data includes the combination of the sub-coordinate (x1−t, y1−t), black, and the flag '1', and the combination of the sub-coordinate (x1−2 t, y1−2 t), black, and the flag '1'. The flag of the sub-coordinates that were not chosen is '0'. This information is also included in the print data.

What is claimed is:

1. A computing device configured to create print data utilized by an ink jet printer, the ink jet printer configured to move at least one of an ink jet head and a print medium so as to relatively move the ink jet head and the print medium in a predetermined direction, the computing device comprising:

a processing unit, one or more non-transitory computer readable media operatively coupled to the processing unit and storing instructions that when executed, cause the computing device to function as:

a determination device configured to determine, for each of a plurality of pixels included in image data, whether a dot is to be formed at a position on a print medium corresponding to a pixel;

a selection device configured to prepare N sub-pixels aligned along the predetermined direction for a specific pixel, wherein N is an integer greater than or equal to 3 and the specific pixel is a pixel for which a determination is made that a dot is to be formed, and the selection device is further configured to randomly select M sub-pixels from the N sub-pixels, wherein M is an integer greater than or equal to 2 and less than N (N>M≥2);

a first creation device configured to create a first type of print data such that the ink jet printer forms dots at positions on the print medium corresponding to the selected M sub-pixels; and an outputting device configured to output the first type of print data to the ink jet printer.

2. The computing device as in claim 1, wherein the ink jet printer is capable of forming at least two types of dots having a different dot size, and the selection device is configured to create the first type of print data such that the ink jet printer forms the dots having a dot size less than the maximum dot size that the ink jet printer is capable of forming.

3. The computing device as in claim 2, wherein the one or more non-transitory computer readable media operatively coupled to the processing unit store instructions that when executed, cause the computing device to function as a second creation device configured to create a second type of print data such that the ink jet printer forms a predetermined type of dot at the position on the print medium corresponding to the specific pixel, wherein the first creation device is configured to create the first type of print data such that a total optical density of the dots corresponding to the selected M sub-pixels is substantially the same as an optical density of the predetermined type of dot, the outputting device is configured to output the first type of print data to the ink jet printer in a first mode, and the outputting device is configured to output the second type of print data to the ink jet printer in a second mode.

4. The computing device as in claim 1, wherein the ink jet printer is a line type printer.

5. A computing device configured to create print data utilized by an ink jet printer, the ink jet printer configured to move at least one of an ink jet head and a print medium so as to relatively move the ink jet head and the print medium in a predetermined direction, the ink jet printer being capable of forming at least two type of dots having a different dot size, the computing device comprising:

a processing unit, one or more non-transitory computer readable media operatively coupled to the processing unit and storing instructions that when executed, cause the computing device to function as:

a determination device configured to determine, for each of a plurality of pixels included in image data, whether a dot is to be formed at a position on a print medium corresponding to a pixel;

a selection device configured to prepare L sub-pixels aligned along the predetermined direction for a specific pixel, wherein L is an integer greater than or equal to 2 and the specific pixel is a pixel for which a determination is made that a dot is to be formed, and the selection device is further configured to randomly select at least one sub-pixel from the L sub-pixels;

a creation device configured to create a type of print data such that the ink jet printer forms a first type of dot having a first dot size at a position on the print medium corresponding to the selected at least one sub-pixel, and the ink jet printer forms a second type of dot having a second dot size at a position on the print medium corresponding to a sub-pixel in the L sub-pixels which has not been selected, the first dot size being different from the second dot size; and an outputting device configured to output the type of print data to the ink jet printer.

6. A non-transitory computer readable medium including a computer program for creating print data utilized by an ink jet printer, the ink jet printer configured to move at least one of an ink jet head and a print medium so as to relatively move the ink jet head and the print medium in a predetermined direction, the computer program including instructions for ordering a computer to perform:

determining, for each of a plurality of pixels included in image data, whether a dot is to be formed at a position on a print medium corresponding to a pixel;

preparing N sub-pixels aligned along the predetermined direction for a specific pixel, wherein N is an integer greater than or equal to 3 and the specific pixel is a pixel for which a determination is made that a dot is to be formed;

randomly selecting M sub-pixels from the N sub-pixels, wherein M is an integer greater than or equal to 2 and less than N (N>M≥2);

creating a type of print data such that the ink jet printer forms dots at positions on the print medium corresponding to the selected M sub-pixels; and outputting the type of print data to the ink jet printer.

7. A non-transitory computer readable medium including a computer program for creating print data utilized by an ink jet printer, the ink jet printer configured to move at least one of an ink jet head and a print medium so as to relatively move the ink jet head and the print medium in a predetermined direction, the ink jet printer being capable of forming at least two types of dots having a different dot size, the computer program including instructions for ordering a computer to perform:

determining, for each of a plurality of pixels included in image data, whether a dot is to be formed at a position on a print medium corresponding to a pixel;

preparing L sub-pixels aligned along the predetermined direction for a specific pixel, wherein L is an integer greater than or equal to 2 and the specific pixel is a pixel for which a determination is made that a dot is to be formed;

randomly selecting at least one sub-pixel from the L sub-pixels;

creating a type of print data such that the ink jet printer forms a first type of dot having a first dot size at a position on the print medium corresponding to the selected at least one sub-pixel, and the ink jet printer forms a second type of dot having a second dot size at a position on the print medium corresponding to a sub-pixel in the L sub-pixels which has not been selected, the first dot size being different from the second dot size; and outputting the type of print data to the ink jet printer.

* * * * *